United States Patent [19]

Iosef

[11] Patent Number: 5,445,804
[45] Date of Patent: Aug. 29, 1995

[54] PROCESS FOR THE MANUFACTURE OF PURE AMORPHOUS SILICA FROM ROCKS

[75] Inventor: Alexander Iosef, Arad, Israel

[73] Assignee: Rotem Fertilizers Ltd., Israel

[21] Appl. No.: 184,593

[22] Filed: Jan. 21, 1994

[30] Foreign Application Priority Data

Feb. 2, 1993 [IL] Israel .................................. 104584
Feb. 14, 1993 [IL] Israel .................................. 104722

[51] Int. Cl.$^6$ ........................................ C01B 33/193
[52] U.S. Cl. .................................. 423/339; 423/340
[58] Field of Search ................................. 423/339, 340

[56] References Cited

U.S. PATENT DOCUMENTS

| | | | |
|---|---|---|---|
| 3,172,727 | 3/1965 | Burke et al. | 423/339 |
| 3,993,497 | 11/1976 | Wason | 423/339 |
| 4,113,184 | 9/1978 | Loughrie | 423/157.2 |
| 4,683,128 | 7/1987 | Orii et al. | 423/340 |
| 4,762,590 | 8/1988 | Engdahl | 423/641 |
| 5,302,364 | 4/1994 | Feinblum | 423/340 |

FOREIGN PATENT DOCUMENTS 293097  4/1989  German Dem. Rep. .
745822  3/1956  United Kingdom ............... 423/339

Primary Examiner—Ferris Lander
Assistant Examiner—Stuart L. Hendrickson
Attorney, Agent, or Firm—Morgan & Finnegan

[57] ABSTRACT

A process for the manufacture of pure amorphous silica from rocks containing non-crystalline silica is described. The process comprises the steps of: (a) dissolution of said rock in an alkaline solution comprising sodium hydroxide and sodium carbonate, obtaining a solution of sodium silicate; (b) precipitation of pure amorphous silica by adding sodium bicarbonate into said sodium silicate and co-producing sodium carbonate, the weight ratio between $SiO_2$ and $Na_2O$ in said dissolution step is in the range of between 0.5 to 3.0; and (c) the sodium carbonate solution is transformed into crystalline sodium bicarbonate, by a salting out reaction with sodium chloride, being recycled to the process. According to a preferred embodiment, the alkaline solution is obtained by the caustification of sodium carbonate with calcium hydroxide. The preferred concentration of sodium hydroxide in said dissolution step is in the range of 4% to 14% by weight.

13 Claims, 2 Drawing Sheets

PROCESS FOR THE MANUFACTURE OF PURE AMORPHOUS SILICA FROM ROCKS

The present invention relates to a process for the manufacture of pure silica from rocks. More particularly the invention relates to a process for the manufacture of pure amorphous silica from rocks containing non-crystalline silica such as: porcellanite, diatomite, and amorphic quartz.

BACKGROUND OF THE INVENTION

Porcellanite is a typical example of a sedimentary rock comprising as a main compound non-crystalline active silica among other constituents considered as impurities. A typical analysis of the main constituents of porcellanite mineral, which exists in Israel is as follows:

$SiO_2$: 69%
$CO_2$: 7% and
$Na_2O$: 0.45%.

Rocks containing non-crystalline silica are found in many places of the world. In Israel, large amounts of pporcellanite are covering the deposits of phosphate rocks near Nahal Zin without being utilized. Moreover, in order to mine the phosphate rock large amounts of porcellanite have to be removed fact which consists a serious ecological problem. Active silica is known as a valuable material useful for many purposes, such as: fillers, extenders, adsorbents, supports, dentrifices, etc.

The literature is quite abundant with many patents describing various approaches for obtaining active silica from alkali metal silicates and a mineral acid such as sulfuric acid or hydrochloric acid. According to the U.S. Pat. No. 3,993,497, precipitated silica is obtained from a sodium silicate solution treated with sulfuric acid and aluminum containing ions.

In the East German Patent Number 293,097, powdered amorphous silica is obtained by reacting alkali metal silicate solutions with an acid or acidic substances, under stirring and adding a mixture of cationic and non-ionic surfactant before reaching an electrolyte concentration of 0.3N.

Although the known processes are yielding various high grades of pure silica, their main disadvantage is the fact that they require a relatively expensive starting reagent such as alkali metal silicate.

It is an object of the present invention to provide a process for obtaining amorphous silica from a natural rock containing it. Another object of the present invention is to provide a proces for obtaining amorphous silica from a natural rock, using unexpensive reagents. It is yet another object of the present invention, to provide a simple process for obtaining amorphous silica of a very high purity from a natural rock containing it. It is a further object of the present invention to provide a simple process for obtaining amorphous silica of a high purity which posssesses a relatively high surface area.

BRIEF DESCRIPTION OF THE INVENTION

The invention relates to a process for the manufacture of pure amorphous silica from rocks containing non-crystalline silica which comprises the steps of: (a) dissolution of said rock in an alkaline solution comprising sodium hydroxide and sodium carbonate, obtaining a solution of sodium silicate and (b) precipitation of pure amorphous silica by adding sodium bicarbonate into said sodium silicate and co-producing sodium carbonate, the weight ratio of $SiO_2$ to $Na_2O$ in said dissolution step, being maintained in the range of between 0.5 to 3.0, and (c) the sodium carbonate solution is transformed into crystalline sodium bicarbonate, by carbonization with gaseous carbon dioxide and a salting out reaction with sodium chloride, being recycled to the process. It was unexpectedly been found that outside this range, the efficiency of silica dissolution is significantly reduced and undesired reactions occur. According to a preferred embodiment the required sodium hydroxide is co-produced in the process, while the sodium carbonate solution is transformed into crystalline sodium bicarbonate by a salting out reaction.

DETAILED DESCRIPTION OF THE FIGURES AND THE PROCESS

Figure 1:
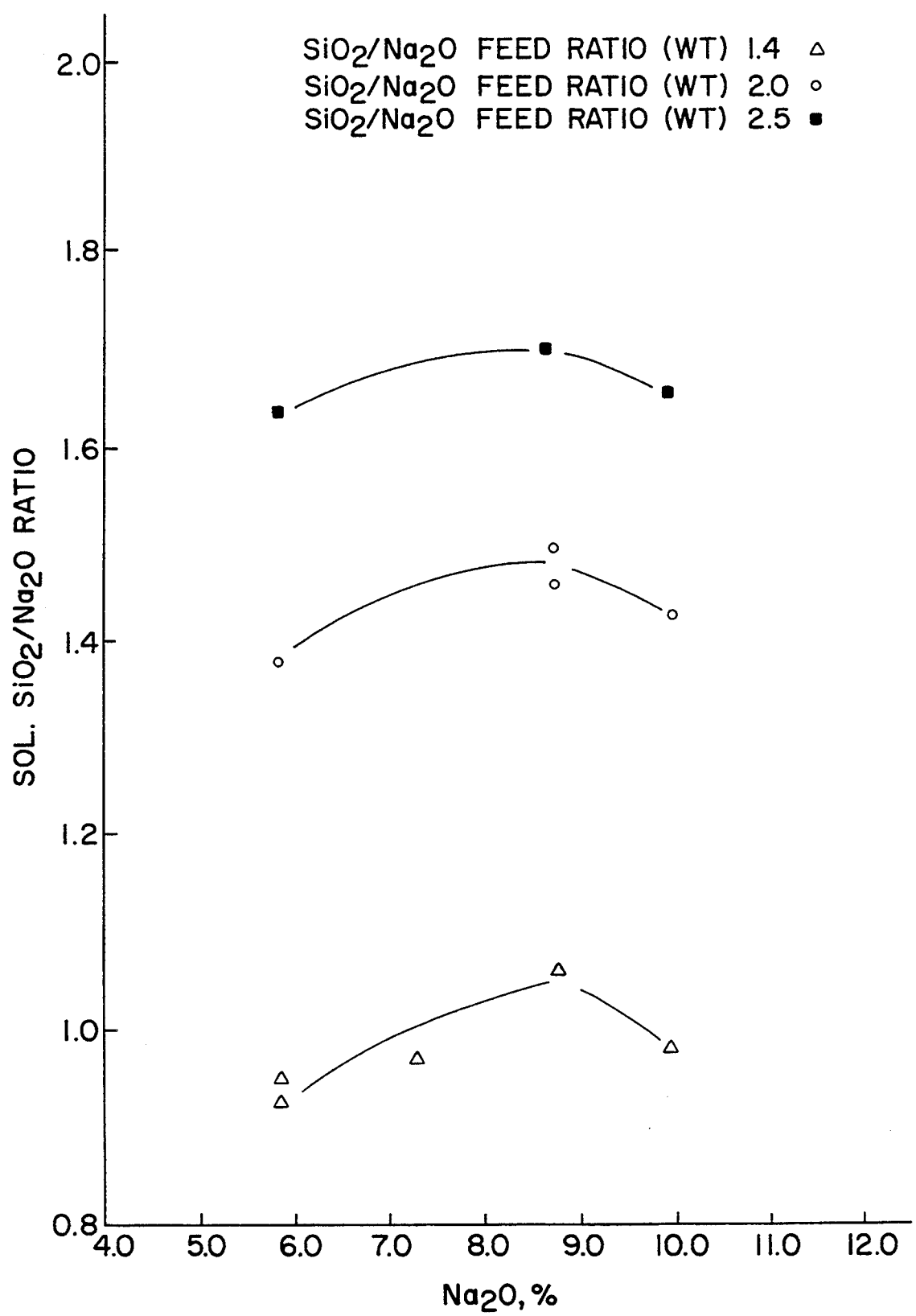
FIG. 1, represents the correlation between the efficiency of silica dissolution, expressed as the ratio $SiO_2/Na_2O$ and the alkalinity expressed as percentage of $Na_2O$.

In FIG. 1, there are presented three graphs correlating the efficiencies of silica dissolution ($SiO_2/Na_2O$) as a function of the alkalinities. As can be noticed, the extent of silica dissolution depends on the weight ratio between silica (expressed as $SiO_2$) to the alkalinity (expressed as $Na_2O$) introduced during the dissolution vessel. In order to get a maximum dissolution, the concentration of the $Na_2O$ should be 8%. As can be noticed, the dissolution extent is significantly increased at the this concentration. The preferred weight ratio of the $SiO_2/Na_2O$ fed is between 0.8 to 3. Below the ratio of 1.5 and even at the above $Na_2O$ concentration, the extent of the silica dissolution is significantly decreased. It was surprisingly found that it is possible to exploit more than one equivalent of $SiO_2$ per unit of $Na_2O$. Also below the weight ratio of 1.1 $SiO_2$ to $Na_2O$, only a small amount of silica is dissolved. The preferred concentration of the sodium hydroxide to be used in the process, in order to increase the conversion, is between 3% to 20% (by weight) and most preferable between 4% to 14%. Below 4% large amounts of solution have to be handled, while above 14%, the resultant mass is quite viscous being difficult to be handled due to various undesired reactions which occur in the system.

Figure 2:
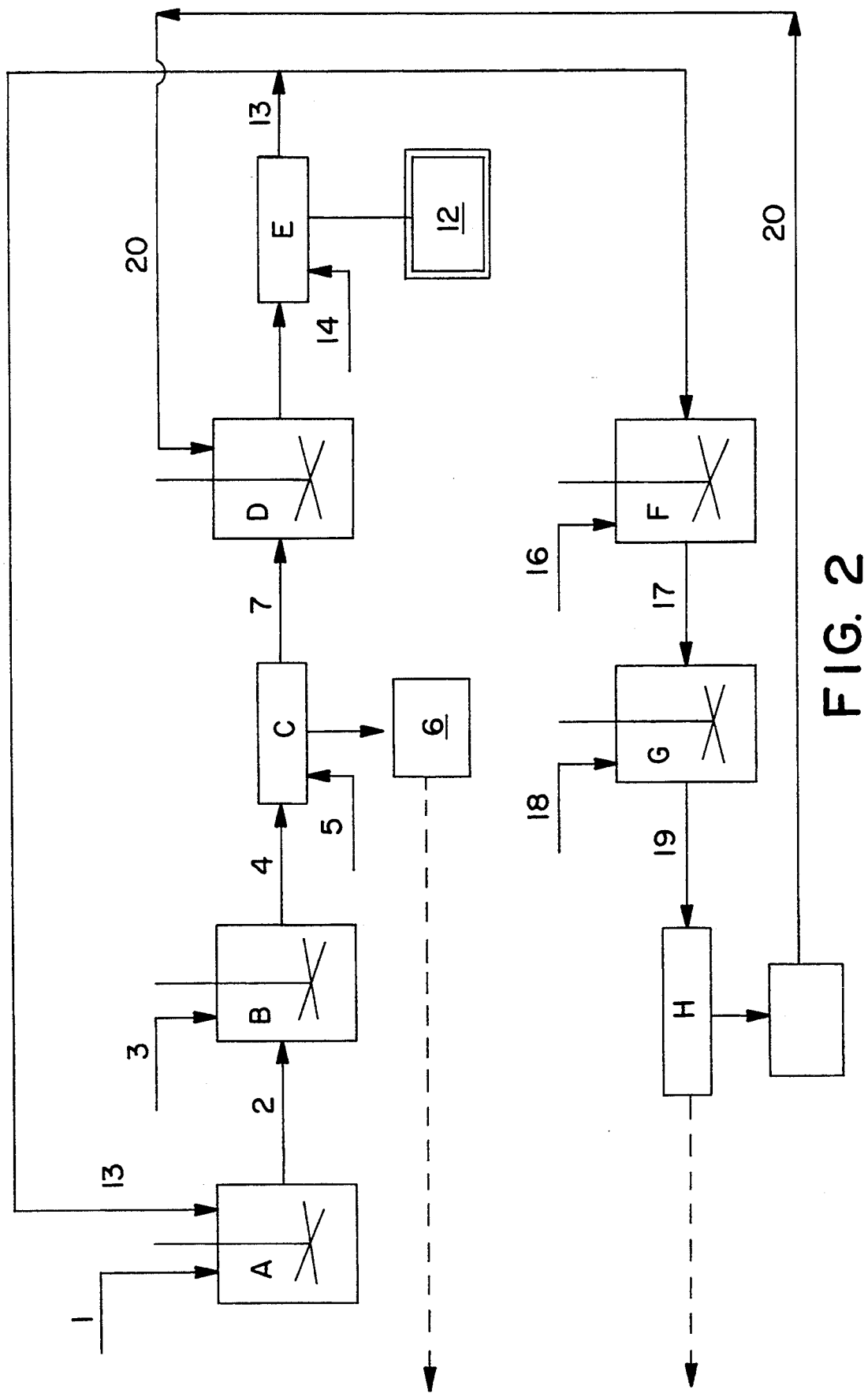
FIG. 2, represents a schematic flowsheet of the process, according to the present invention.

In FIG. 2, a schematic flowsheet of the process with a preferred embodiment is presented:

Sodium carbonate (13), which is coproduced from the last step and may contain impurities present in the starting rock, is reacted with a slurry of calcium hydroxide (1) in a vessel (A), generating a slurry (2) of sodium hydroxide and calcium carbonate. The reaction involved in this stage is as follows:

$$Na_2CO_3 + Ca(OH)_2 = CaCO_3 + 2NaOH \qquad (1)$$

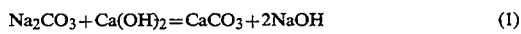

This reaction, being carried out at a temperature in the range of between 50° to 150° C. and preferably in the range of between 80° to 100° C., goes smoothly and stoichiometrically. The calcium carbonate obtained has a beneficial effect since it assists the filtration and also absorbs some of the organic matter and other impurities present in the subsequent step.

The slurry as obtained above is conveyed into a vessel (B) where it reacts with the rock containing non-crystalline silica (3), ground to a particle size in the range of between 50 to 350 mesh (Tyler scale), producing a solution of sodium silicate. The resulted mixture is filtered (C), and the solids which comprise the calcium carbonate after washing by tap water (5) are discarded (6). The reaction involved is as follows:

$$2NaOH + \text{silica-containing rock} \rightarrow Na_2SiO_3 \quad (2)$$

The sodium silicate and the wash solution (7) are conveyed into a vessel (D) whereby by adding sodium bicarbonate (20), the excess of sodium silicate is transformed into amorphous pure silica and sodium carbonate. The reaction involved in this stage is as follows:

$$Na_2SiO_3 + 2NaHCO_3 = 2Na_2CO_3 + SiO_2 + H_2O \quad (3)$$

The reaction with sodium bicarbonate for precipitating the amorphous silica is most preferred, in view of the rapid kinetics and controlled rate of the reaction, thus enabling to obtain a product with the desired properties. Sodium bicarbonate, contrary to the usual mineral acids such as sulphuric acid or nitric acid, being a weak acid will involve an insignificant thermal effect enabling a controlled pH to the final product, thus obtaining a free-flow powder possessing a high surface area and avoiding agglomeration of the fine particles.

The slurry (11) containing the solution of sodium carbonate and silica is filtered (E) obtaining the amorphous silica product (12) and a solution of sodium carbonate. The cake of silica is washed by water (14), and the resulting solution (15) is added to the filtrate (13). In this manner, the solution of sodium carbonate will contain less than 0.1% by weight $SiO_2$. In a preferred embodiment, the cake obtained after said washing is further washed by a dilute solution of hydrochloric acid which removes completely any metal constituents, such as copper, alumina, sodium and manganese and oxides thereof, producing a final amorphous silica having a purity of above 99%. Moreover, it was found that the washing with a dilute HCl solution, improves significantly the surface area of the amorphous silica product. Thus, without any washing by HCl the surface area of the product was 128 $m^2/g$, compared with 603 $m^2/g$ when a washing with a dilute solution of HCl (15 g/l).

According to a most preferred embodiment, the sodium bicarbonate required in the above stage is produced from the sodium carbonate obtained in the process, by carbonization and a salting out reaction using sodium chloride. The carbonization is carried out by the use of carbon dioxide, in a reaction with sodium carbonate in order to obtain the sodium bicarbonate. The chemical reactions involved in this step are as follows:

$$Na_2CO_3 + CO_2 + H_2O = 2NaHCO_3 \text{ (solution)} \quad (4)$$

$$NAHCO_3 \text{ (solution)} + NaCl \text{ (solid)} = NAHCO_3 \text{ (solid)} + NaCl \text{ (solution)} \quad (5)$$

One of the main advantages of this embodiment is that it enables a substantially complete recovery of the silica present with the sodium carbonate. Also it enables to decrease to a minimum the required reagents, a substantial amount thereof being co-produced in the process. In the filtration step (H), the aqueous solutions to be discarded (21) contain most of the cationic impurities normally present in silica containing rocks, such as: Ca, Mg, Zn, $Al_2O_3$ which are soluble in the alkaline solution, thus producing a very pure amorphous silica.

In contrast to the known methods for obtaining amorphous silica from rocks such as by fusion, which are carried out batchwise, the process according to the present invention has a particular advantage that may be carried out in a continuous manner, which has significant merits.

The invention will be hereafter illustrated by the following Examples, being understood that these Examples are presented only for a better understanding of the invention without limiting its scope. A person skilled in the art, after reading the present specification will be in a position to insert slight modifications without being outside the invention as covered by the appended claims.

In the Examples, the concentrations are given by weight percentages unless otherwise stated.

EXAMPLE 1

The experiment was carried out in a continuous manner as described below:

A solution of 2022 ml/h of sodium carbonate (8.77% $Na_2O$) at a temperature of about 85° C., was thoroughly mixed with 437 g/h of calcium hydroxide for about 60 minutes. To the resulted slurry, it was added an amount of 627 g/h of porcellanite from Nahal Zin containing 61.8% $SiO_2$, having a particle size of 50 mesh, the weight ratio $SiO_2/Na_2O$ being 1.40. The agitation of the mixture was continued for about 30 minutes and the resulted slurry was filtered under vacuum and tile solids were washed with 800 ml/h of water. The resulted solution from said washing, was added to the above filtrate thus obtaining 3818 ml/h of a solution and 1417 g/h of solids.

The analyses of said filtrate and solids were as follows:

| Solids (on dry basis). | | Filtrate. | |
| --- | --- | --- | --- |
| $SiO_2$ | 19.04% | $SiO_2$ | 6.44% |
| $Na_2O$ | 2.8% | $Na_2O$ | 6.44% |
| | | $SiO_2/Na_2O$ | 1.0 |

The yield of silica dissolution from the starting porcellanite was 71.4%.

The filtrate was introduced into a vessel provided with an agitator in which a slurry of sodium bicarbonate was introduced during about 40 minutes. The slurry was prepared by reslurying 1166 g/h (on dry basis) of sodium bicarbonate, precipitated after its salting out by sodium chloride in the last stage of the process, in 3346 g/h of slurry. The reaction mixture was maintained at a temperature of about 50° C. and silica precipitation was noticed. At the end of precipitation only traces of silica (0.1%) remained in the solution.

The slurry was filtered and the cake was washed by an amount of 900 ml/h of warm water (about 60° C.). The washed cake of silica was reslurried by a dilute solution of HCl reaching a pH of about 6 and filtered again. The cake was washed with warm water, until its chloride content was below 100 ppm (on dry basis).

The wet pure silica in amount of 618 g/h (61.4% moisture) was dried in a static oven at 250° C. obtaininig 265 g/h of dry amorphous silica product.

The first washing solution in amount of 920 g/h, containing 0.5% $SiO_2$, was recycled to the first stage for the caustification, to be used in another cycle.

The analysis of the final amorphous silica product (6.5% moisture) was as follows:

| SiO₂: | 99.6% | Al₂O₃: | 0.08% | Na₂O: | 0.06% |
| --- | --- | --- | --- | --- | --- |
| Fe₂O₃: | 166 ppm | Mn: | below 1 ppm | Cu: | elow 1 ppm |
| Ba: | 4 ppm | Zn: | 1.5 ppm | Cd: | 0.3 ppm |
| Ni: | 0.5 ppm | Ca: | 5 ppm | Cr | 3 ppm |
| Ti: | 0.5 ppm | Mg: | 4 ppm | | |

The physical properties of the product were as follows:
Specific surface (BET): 581
Bulk density (tamped): 152 g/l An amount of 2022 ml/h of the above filtrate was recycled to the vessel for caustification, maintained at a temperature of 80° C. producing the required alkaline solution. The remaining amount of 3544 ml/h of filtrate was introduced into a vessel where by bubbling an amount of 170 g/h of carbon dioxide, a solution was obtained comprising 9.9% sodium bicarbonate and 0.97% sodium carbonate. Under a thorough mixing, an amount of 785 g/h of solid chloride was added at a temperature of about 40° C. obtaining a slurry which was filtered out. The solid obtained consisted of 1352 g/h of crystalline sodium bicarbonate (14% humidity) and was recycled to the process. The filtrate in amount of 3614 ml/h containing 0.49% sodium carbonate and 0.19% sodium bicarbonate together with the dissolved cations impurities was discarded.

EXAMPLE 2 (in a continuous operation).

An amount of 1328 ml/h of sodium carbonate (8.77% Na₂O) at a temperature of about 90° C., was mixed with 230.0 g/h of calcium hydroxide for about one hour. To the resulted slurry, an amount of 731 g/h of porcellanite (from Nahal Zin, containing 61.8% SiO₂) with a particle size of about 50 mesh was added, the weight ratio SiO₂/Na₂O being 2.30. After a thorough agitation for about 30 minutes, the resulted slurry was filtered by vacuum and the solids washed by water (615 ml/h). The yield of silica dissolution from porcellanite was 61%. The resulted solution from this washing was added to the filtrate, obtaining 2465 ml/h of a solution and 1089 g/h of solids. The analyses of the solution and the solids were as follws:

| The solids (on dry basis) | | The solution. | |
| --- | --- | --- | --- |
| SiO₂: | 34.4% | SiO₂: | 9.83% |
| Na₂O: | 3.0% | Na₂O: | 7.29% |
| Humidity: | 44.6% | SiO₂/Na₂O: | 1.4% |

The solution was introduced into a vessel provided with an agitator in which a slurry of sodium bicarbonate was introduced for about 40 minutes. The mixture thus prepared by reslurrying the sodium bicarbonate, precipitated after salting out the sodium bicarbonate by sodium chloride at a temperature of about 50° C. in the last stage of the process, was 380.3 g/h of sodium bicarbonate (on dry basis) in an amount of 1091 g/h of slurry. The mixture was kept at a temperature of about 50° C. and silica precipitation was noticed. At the end of the precipitation, only traces of silica, below 0.1% were noticed in the solution. The slurry was filtered and the cake washed by 347 ml/h of warm water (about 60° C.). The washed cake of silica was reslurried by diluted HCl and washed again up to a pH of about 6 and filtered. The cake was washed with warm water until the residual chloride on the cake was below 100 ppm (on dry basis).

The wet pure silica in an amount of 618 g/h (61.4% humidity) was dried in an oven at a temperature of 250° C., obtaining 265 g of pure amorphous silica.

The first washing slution, 370 ml/h containing 0.5% of silica, was recycled to the caustification stage in a further cycle. The analysis of the amorphous silica product, having a moisture content of 6.3%, was as follows:

| SiO₂: | 99.7% | Mn: | below 1 ppm; | Zn: | 2.0 ppm |
| --- | --- | --- | --- | --- | --- |
| Al₂O₃ | 0.10% | Cu: | below 1 ppm; | Cd: | 0.2 ppm |
| Na₂O | 0.08% | Ba: | 5 ppm; | Ni: | 0.8 ppm |
| Fe₂O₃ | 58 ppm | Ca: | 7 ppm; | Cr: | 3 ppm |
| | | Mg: | 6 ppm; | Ti: | 0.5 ppm |

The physical properties of the product were as follows:
Specific surface (BET): 583;
Bulk density—tamped: 162 g/l An amount of 1328 ml/h of the last filtrate as obtained above was recycled into the vessel for caustification, thus producing the alkaline solution for dissolution. The remaining amount of 1156 ml/h of filtrate was introduced into a vessel, where by bubbling an amount of 125 g/h of pure carbon dioxide, a solution resulted comprising 9.9% sodium bicarbonate and 0.97% sodium carbonate. An amount of 256.1 g/h of sodium chloride was added, under a continuous agitation at a temperature of about 30° C. producing a slurry which was filtered. The resulted cake consisted of 441 g/h of sodium bicarbonate crystals (14% humidity) which were recycled to the process. The filtrate obtained in amount of 1180 ml/h, which contained 0.49% sodium carbonate and 1.9% sodium bicarbonate together with the dissolved cation impurities was discarded.

I claim:
1. A process for the manufacture of pure amorphous silica from rocks containing non-crystalline silica which comprises the steps of:
(a) dissolving said rock in an alkaline solution comprising sodium hydroxide and sodium carbonate, obtaining a solution containing sodium silicate, the concentration of sodium hydroxide in said alkaline solution being between 3% to 20% by weight, the weight ratio between the silica in said rock expressed as SiO₂ and the alkalinity in said alkaline solution expressed as Na₂O being between 0.5 and 3.0;
(b) adding sodium bicarbonate to said sodium silicate containing solution to produce a solution containing sodium carbonate and a pure amorphous silica precipitate;
(c) separating the pure amorphous silica from the solution produced in step (b), leaving a solution containing sodium carbonate;
(d) adding gaseous carbon dioxide and sodium chloride to the sodium carbonate solution to transform the sodium carbonate containing solution into crystalline sodium bicarbonate, the sodium carbonate in said sodium carbonate containing solution reacting with said gaseous carbon dioxide to produce a sodium bicarbonate containing solution and the sodium bicarbonate in said sodium bicarbonate containing solution reacting with said sodium chloride to produce said crystalline sodium bicarbonate; and
(e) recycling said crystalline sodium bicarbonate to step (b) of said process.

2. The process according to claim 1, wherein in step (a) said alkaline solution is obtained by the caustification of sodium carbonate with calcium hydroxide.

3. The process according to claim 1, wherein the weight ratio $SiO_2/Na_2O$ of the reactants entered into the dissolution step is between 0.8 to 3.

4. The process according to claim 1, wherein the pure amorphous silica precipitate separated out in step (c) is first washed by water, followed by a further washing with a dilute solution of hydrochloric acid which will remove completely any metal constituents contained in said precipitate.

5. The process according to claim 1, wherein the concentration of sodium hydroxide in said alkaline solution in step (a) is in the range of between 4% to 14% by weight.

6. The process according to claim 1, wherein the silica-containing rock used in the dissolution step has a particle size in the range of between 50 to 350 Tyler mesh.

7. The process according to claim 2, wherein sodium carbonate containing solution from step (c) of said process is recycled for use as sodium carbonate reactant in the caustification step.

8. The process according to claim 1, wherein calcium carbonate is present during the dissolution of said rock containing non-crystalline silica by the alkaline solution, assists filtration of the sodium silicate and retains most of the impurities present in said rock.

9. The process according to claim 1, wherein said rock containing non-crystalline silica is selected from porcellanite, diatomite and amorphous silica.

10. The process according to claim 1, carried out in a continuous manner.

11. The process according to claim 7, carried out in a continuous manner.

12. The process according to claim 1, wherein in step (a) the weight ratio between $SiO_2$ and $Na_2O$ is above 1.5 and up to 3.0.

13. A continuous process for the manufacture of pure amorphous silica from rocks containing non-crystalline silica $SiO_2$, and $Na_2O$, which comprises the steps of:
  (a) dissolving said rock in an alkaline solution comprising sodium hydroxide, sodium carbonate and calcium carbonate, obtaining a solution containing sodium silicate, the concentration of sodium hydroxide in said alkaline solution being between 3% to 20% by weight, the weight ratio between the silica in said rock expressed as $SiO_2$ and the alkalinity in said alkaline solution expressed as $Na_2O$ being between 0.5 and 3.0;
  (b) adding sodium bicarbonate to said sodium silicate containing solution to produce a solution containing sodium carbonate and a pure amorphous silica precipitate;
  (c) separating the pure amorphous silica from the solution produced in step (b), leaving a solution containing sodium carbonate;
  (d) washing said pure amorphous silica precipitate with water and then with a dilute solution of hydrochloric acid which will remove completely any metal constituents contained in said precipitate;
  (e) adding gaseous carbon dioxide and sodium chloride to the sodium carbonate solution to transform the sodium carbonate into crystalline sodium bicarbonate, the sodium carbonate in said sodium carbonate containing solution reacting with said gaseous carbon dioxide to produce a sodium bicarbonate containing solution and the sodium bicarbonate in said sodium bicarbonate containing solution reacting with said sodium chloride to produce said crystalline sodium bicarbonate; and
  (f) recycling said crystalline sodium bicarbonate to step (b) of said process.

* * * * *